United States Patent
Brown et al.

(10) Patent No.: US 10,138,944 B2
(45) Date of Patent: Nov. 27, 2018

(54) ELECTRIC PHASER COUPLING METHOD

(71) Applicant: BorgWarner Inc., Auburn Hills, MI (US)

(72) Inventors: Daniel Brown, Freeville, NY (US); Roger T. Simpson, Ithaca, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 101 days.

(21) Appl. No.: 15/316,197

(22) PCT Filed: May 29, 2015

(86) PCT No.: PCT/US2015/033145
§ 371 (c)(1),
(2) Date: Dec. 5, 2016

(87) PCT Pub. No.: WO2015/191309
PCT Pub. Date: Dec. 17, 2015

(65) Prior Publication Data
US 2017/0198755 A1    Jul. 13, 2017

Related U.S. Application Data

(60) Provisional application No. 62/011,100, filed on Jun. 12, 2014.

(51) Int. Cl.
*F01L 1/34* (2006.01)
*F16D 3/10* (2006.01)
(Continued)

(52) U.S. Cl.
CPC ............... *F16D 3/10* (2013.01); *F01L 1/352* (2013.01); *F16D 3/64* (2013.01); *F16D 3/77* (2013.01)

(58) Field of Classification Search
CPC ...... F16D 3/10; F16D 3/64; F16D 3/77; F01L 1/352
See application file for complete search history.

(56) References Cited

U.S. PATENT DOCUMENTS 4,043,437 A   8/1977  Taylor
4,897,073 A   1/1990  Chivari
(Continued)

FOREIGN PATENT DOCUMENTS

EP      1064468 B1      4/2002
JP      10-231845 A     9/1998
JP      2001-349338 A   12/2001

OTHER PUBLICATIONS

International Search Report and Written Opinion in PCT/US2015/033145 dated Aug. 21, 2015 (12 pages).

*Primary Examiner* — Zelalem Eshete

(57) ABSTRACT

A coupling assembly (20, 120, 220) and method can include a first rotatable member (22, 122, 222) and a second rotatable member (26, 126, 226) defining a cylindrical hub portion having a plurality of springs (42, 142, 242) interposed between the cylindrical hub portion of the second rotatable member (26, 126, 226) and the first rotatable member (22, 122, 222) for transferring rotational torque between the first and second rotatable members. A plurality of load-bearing surfaces (32, 132, 232) associated with the first rotatable member (22, 122, 222) are engageable by the plurality of springs (42, 142, 242) to accommodate radial clearances (34, 36, 134, 136, 234) between the first rotatable member (22, 122, 222) and the cylindrical hub portion while providing rotational drive torque from the first rotatable member (22, 122, 222) to the second rotatable member (22, 122, 222) through the plurality of springs (42, 142, 242).

15 Claims, 9 Drawing Sheets

(51) Int. Cl.
  *F01L 1/352* (2006.01)
  *F16D 3/64* (2006.01)
  *F16D 3/77* (2006.01)

(56) References Cited

U.S. PATENT DOCUMENTS

| | | |
|---|---|---|
| 5,700,197 A | 12/1997 | Kuribayashi |
| 6,325,722 B1 | 12/2001 | Ciotola |
| 6,500,071 B1 | 12/2002 | Pollard |
| 7,641,557 B2 | 1/2010 | Bartlett |
| 2006/0156855 A1 | 7/2006 | Yukawa et al. |
| 2008/0047511 A1 | 2/2008 | Taye et al. |

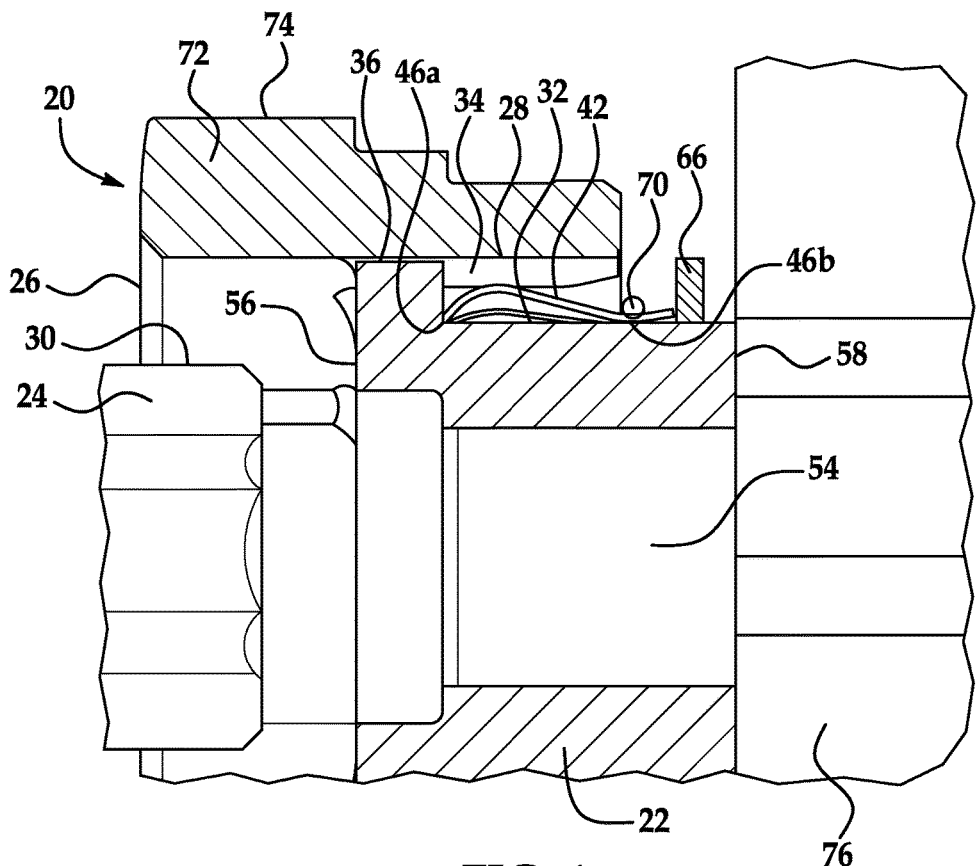
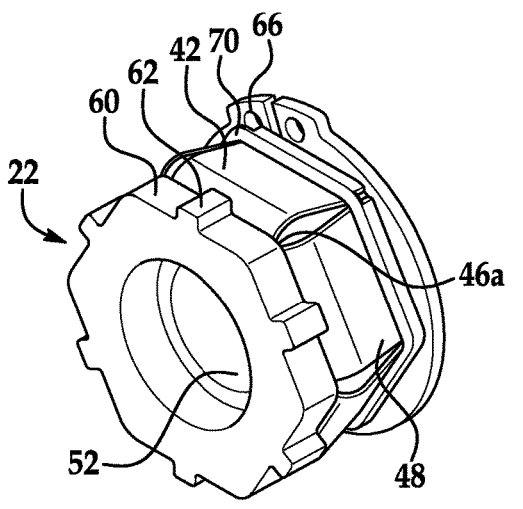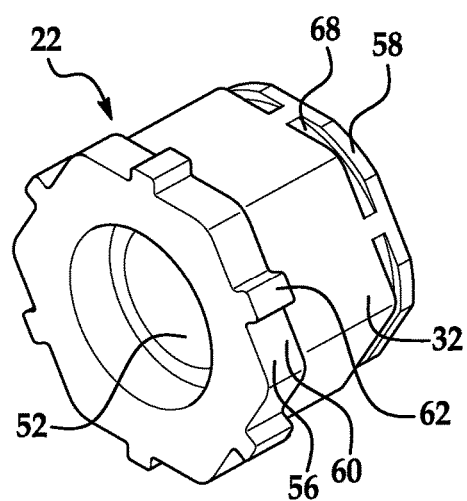
FIG. 1
FIG. 2  FIG. 3

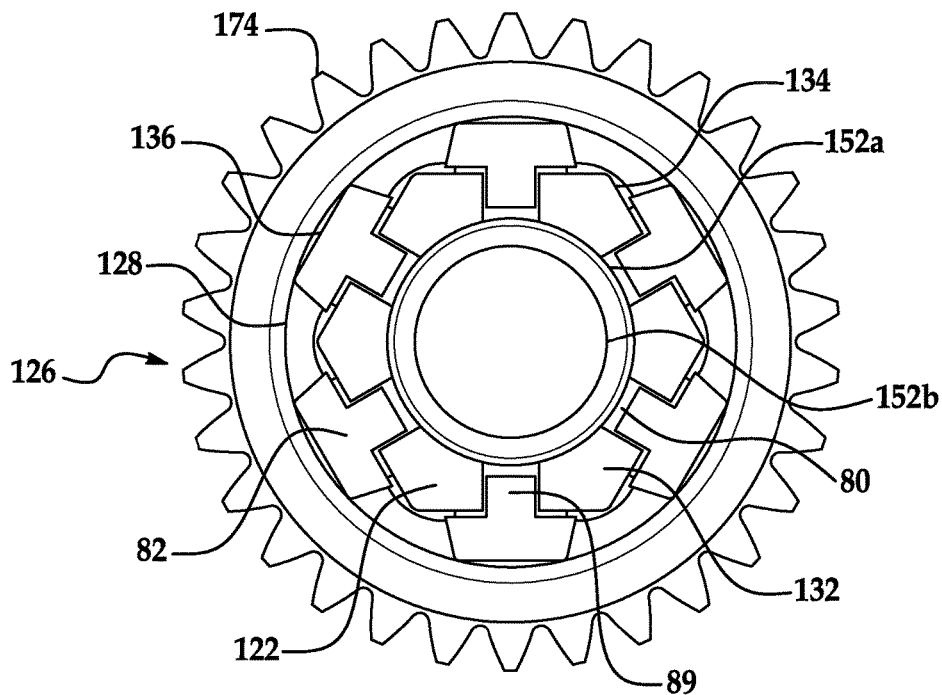
FIG. 8
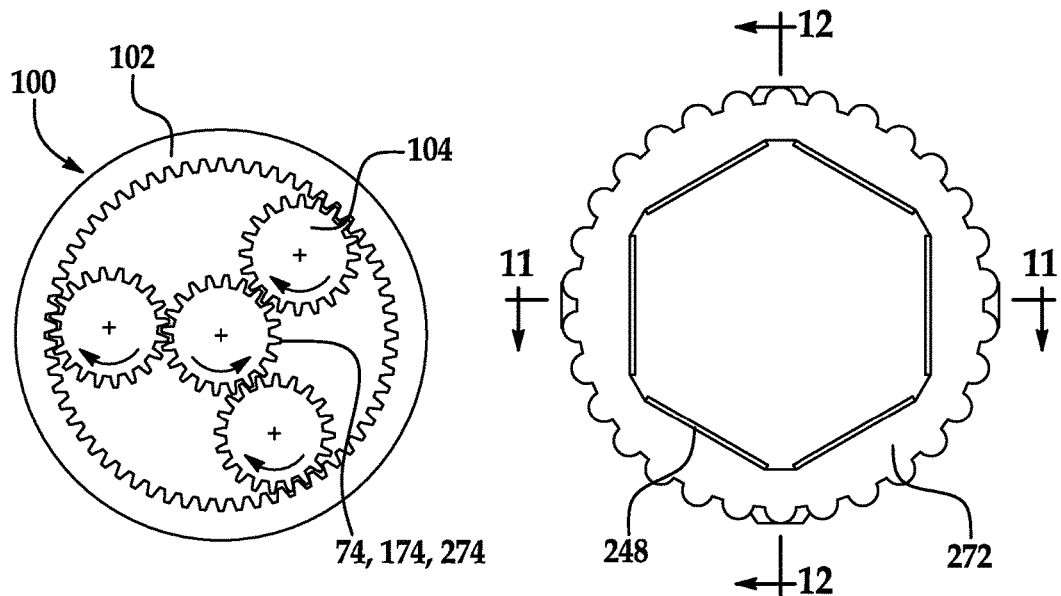
FIG. 9
FIG. 10A

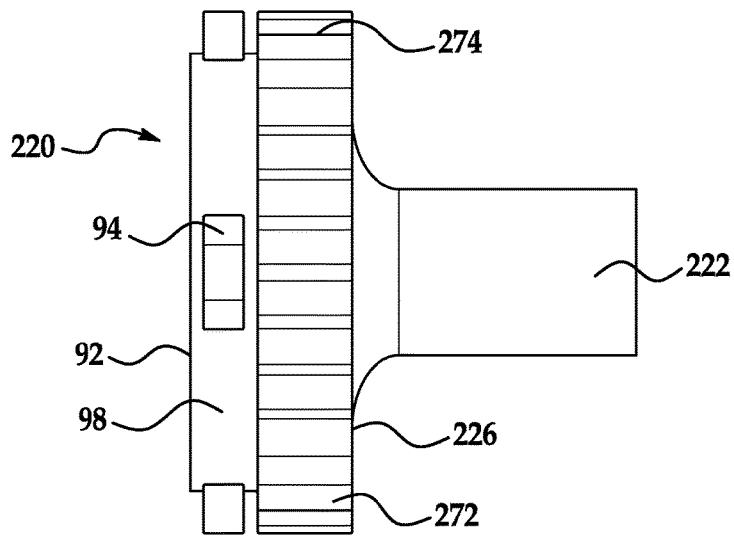
FIG. 10B
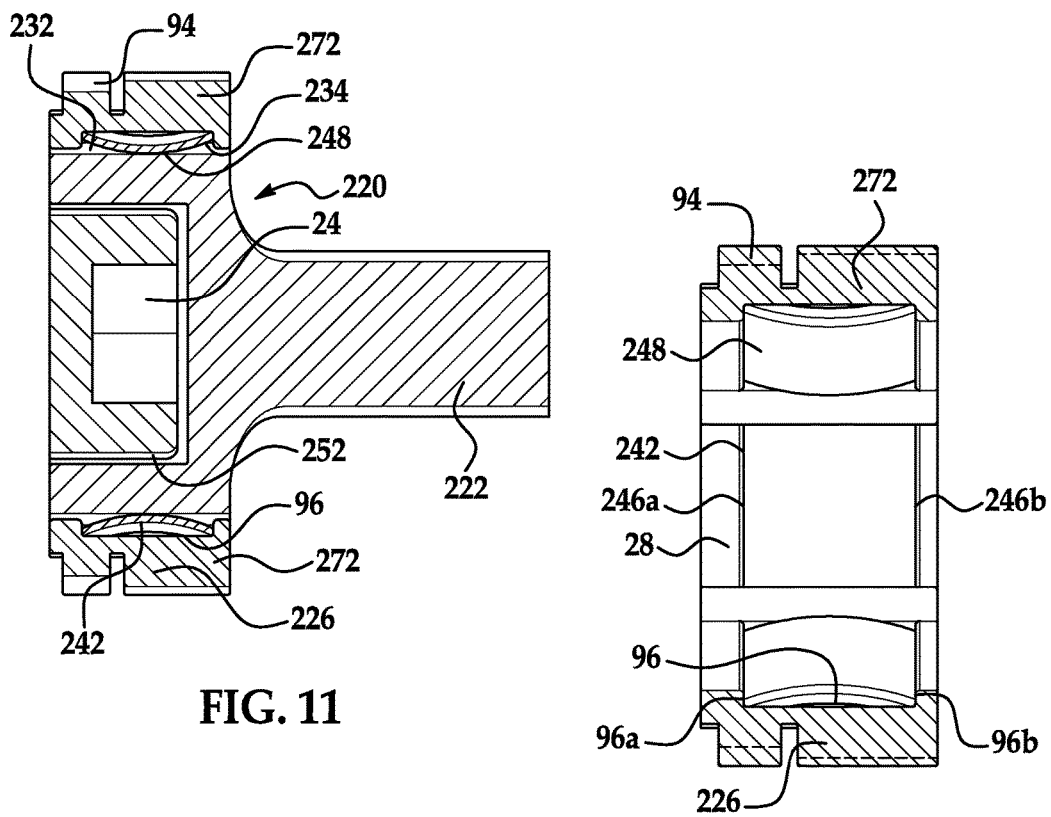
FIG. 11
FIG. 12

ELECTRIC PHASER COUPLING METHOD

FIELD OF THE INVENTION

The invention relates to a coupling assembly for transmitting torque between first and second rotatable shafts and, more particularly, to a flexible coupling assembly for transmitting rotational torque from an electric motor to a pump or actuator of an internal combustion engine.

BACKGROUND

In various mechanisms for transmitting rotational torque, end portions of two rotational shafts require a coupling assembly for common rotation of the shafts. In an internal combustion engine, the engine or an electric motor can drive the input shaft which can transfer rotational torque to drive an output shaft. Assembling the input and output shafts require effort and precision in axial alignment of the input and output shaft having separate longitudinal axes for transmitting a maximum amount of rotational torque between the members. Coupling the input and output shaft can also result in radial and angular misalignment or clearances between the rotating shafts. Currently used coupling assemblies can include flexible members such as springs, rubber pieces, or the like. Known flexible couplings are disclosed in U.S. Pat. Nos. 7,641,557; 6,500,071; 6,325,722; 5,700,197; 4,897,073; and E.P. Patent No. 1,064,468.

In many cases in an internal combustion engine, it is desirable to assemble the two shafts without any secondary assembly operations such as tightening a collar around one of the shafts. A spline coupling is commonly used to simplify assembly. In a spline coupling, one shaft includes an external spline, and the other shaft includes an internal spline. Assembly is achieved by mating the internal and external splines. Limitations of a spline coupling include cost of creating the splines on the shafts, backlash in the splines coupling that results in increased noise, vibration, and harshness as well as increased shock loading under reversible torques. Misalignment of the spline coupling may reduce its strength or produce excessive reaction loads on the mating shafts. Another method of assembling an input shaft to an output shaft involves using a tapered fit, sometimes with extra features to increase torque capacity of the coupling. However, such devices again can be expensive to manufacture and require an additional axial force to keep pressure on the tapered surface. To accommodate misalignment, such couplings can include a flexible member such as a bellows or beam coupling.

SUMMARY

Components can be used in a coupling assembly to compensate for axial misalignment and radial clearance when coupling a first rotatable shaft and a second rotatable shaft having longitudinal primary and secondary axes, respectfully, while transmitting rotational torque between the shafts. Radial clearances can be minimized while providing for rotational torque transmission from the input shaft to the output shaft. Vibration can also be accommodated typically occurring in the engine or motor which can further cause axial misalignment. Backlash can be eliminated or reduced between the input and output shaft. Two shafts can be assembled together by bringing the two shafts together in an axial direction without additional operations. The device can be integrally formed, connected or attached to one of the shafts (a driven component or a driving actuator) external to a cover or other barrier in the engine compartment, thereby eliminating access to the coupling between shafts after assembly. One of the shafts can be made hollow to allow for a mechanism to lock the coupling in place against rotational backlash. A coupling assembly can be annular in shape and can have leaf springs, such that when torque is applied to the coupling, tensile strain develops in the leaf springs and the leaf springs can accommodate compressive displacement. To overcome the limitation of current technology, the disclosed coupling assembly can include a first rotatable member having a plurality of external load-bearing surfaces, a plurality of springs engageable with the load-bearing surfaces and extending radially outwardly, and a second rotatable member.

The second rotatable member can define a cylindrical hub encircling the first rotatable member and can have an interior surface radially spaced outwardly from the load-bearing surfaces of the first rotatable member. Each of the plurality of springs can be engageable with the interior surface for transferring rotational torque from the first rotatable member to the second rotatable member. An interstitial space can be defined between the load-bearing surfaces of the first rotatable member and the interior surface of the second rotatable member. The interior surface can provide radial clearances between the first rotatable member and the cylindrical hub portion of the second rotatable member to accommodate axial misalignment and build up of manufacturing and assembly tolerances. The plurality of springs can provide transfer of rotational driving torque from the first rotatable member to the second rotatable member.

The coupling assembly can be included in an electrically driven phaser for varying a phase relationship between a camshaft and a crankshaft of an internal combustion engine. The electrically driven phaser can include an electric motor having a first shaft, a planetary gear transmission including a sun gear connected to the first shaft, a plurality of planetary gears supported by a planetary gear carrier connected to the camshaft, and a ring gear driven by the crankshaft. The planetary gear transmission can transfer rotational torque from the first shaft to the camshaft and the coupling assembly can transmit torque between the first shaft and the sun gear. In the electrically driven phaser, the first rotatable member can have a plurality of external load-bearing surfaces operably associated with the first shaft of the electric motor or additional gear reducer.

A method of compensating for mechanical tolerance in coupling the first rotatable shaft and the second rotatable shaft can include forming the first rotatable member having a plurality of external load-bearing surfaces extending between a first end and a second end, assembling the plurality of springs to engage the load-bearing surfaces and extend radially outwardly, and positioning a second rotatable member defining a cylindrical hub to enclose and sheath the first rotatable member. The cylindrical hub can encircle the first rotatable member and the plurality of springs can be interposed between the first rotatable member and the second rotatable member. The method can further include forming a plurality of recesses through the plurality of load-bearing surfaces, interposing a plurality of locking members tapered at one end between the cylindrical hub portion of the second rotatable member and the first rotatable member, and inserting a central hub operably associated with the plurality of locking members. The first rotatable member can have a first inner surface for receiving the central hub and a second inner surface for receiving the first rotatable shaft. Each of the plurality of locking members can be biased radially outwardly by a corresponding one of the plurality of springs and engageable through a corresponding one of the plurality of recesses. Each of the plurality of locking members can include a seating surface engageable with one of the plurality of load-bearing surfaces. The method can further include preventing axial and lateral movement of the plurality of springs, such as inserting a retaining ring, and anchoring each of the plurality of springs to one of the plurality of load-bearing surfaces via a retainer clip, wire wrap, or other apparatus as required to achieve the desired spring load, spring rate, or assembly process. The springs can instead be anchored and axially constrained at one or both ends by fit, press fit, swaging, welding, brazing, fastening, or other manufacturing method known to one skilled in the art.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a detailed cross sectional view of a coupling assembly;

FIG. 2 is a perspective view of a first rotatable member illustrating a plurality of leaf springs;

FIG. 3 is a perspective view of the first rotatable member in FIG. 2 illustrating a structure of the first rotatable member with the plurality of leaf springs removed for clarity;

FIG. 8 is an end view of a cylindrical hub portion of the second rotatable member engaged with the first rotatable member of FIG. 6;

FIG. 9 is a simplified schematic view of a planetary gear system for driving a phaser of an internal combustion engine with an electric motor illustrating a sun gear coupled to a phasing member;

FIG. 10A is a front view of the sun gear and coupling assembly illustrating the cross sections taken for FIGS. 11 and 12;

FIG. 10B is a side view of the sun gear and coupling assembly of FIG. 10A;

FIG. 11 is a cross sectional view of the sun gear and coupling assembly of FIGS. 10A-10B;

FIG. 12 is an enlarged detailed cross sectional view of the cylindrical hub portion of the second rotatable member of FIGS. 10A-11 illustrating a plurality of leaf springs extending radially;

DETAILED DESCRIPTION

Figure 4:
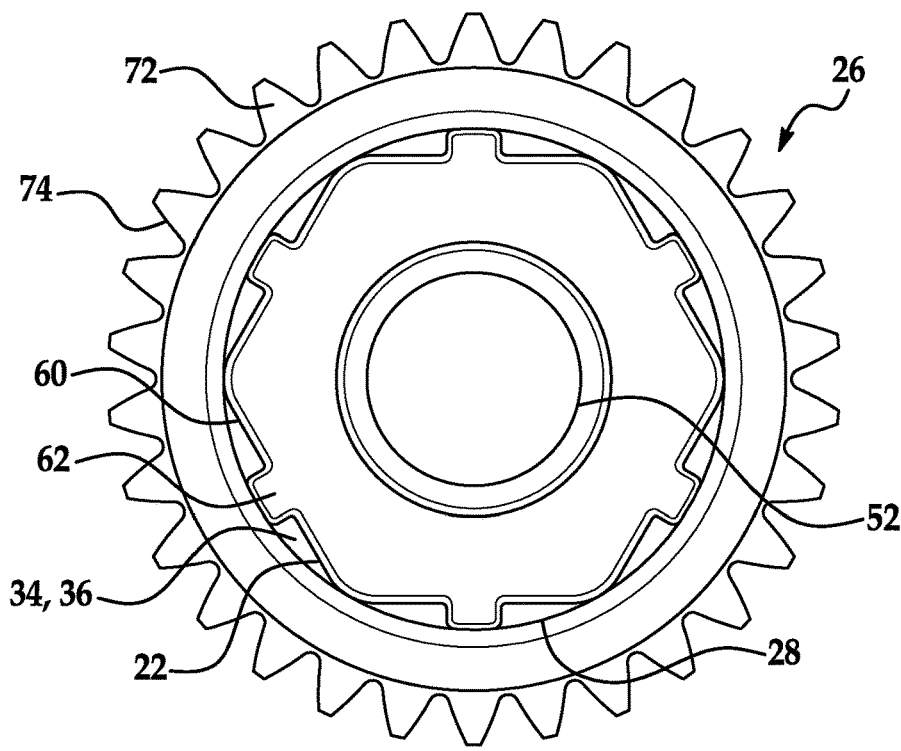
FIG. 4 is an end view of a cylindrical hub portion of the second rotatable member illustrating the first rotatable member located in a cylindrical hub portion of the second rotatable member.

Referring now to FIGS. 1-12, a coupling assembly 20, 120, 220 can include a first rotatable member 22, 122, 222 having a longitudinal primary axis and a second rotatable member 26, 126, 226 having a longitudinal secondary axis. The coupling assembly 20, 120, 220 can be operable for transmitting torque from a first rotatable member 22, 122, 222, such as a first shaft 54, to a second rotatable shaft 24 through a planetary gear transmission assembly. The coupling assembly 20, 120, 220 can be operable in an internal combustion engine having rotatable components, a crankshaft, and a camshaft operable for opening and closing intake and exhaust valves located in the engine. In the internal combustion engine, the first rotatable shaft 22, 122, 222 can be associated with an electric motor 76 or an actuator and the second rotatable shaft 24 can be associated with a rotatable camshaft operable through a planetary gear phasing assembly 100, as best seen in FIG. 9. The phasing assembly 100 can be operable for varying a phase relationship between the crankshaft and the camshaft allowing the valves to open and close during different cycles of the internal combustion engine. The planetary gear phasing assembly 100 can include a ring gear 102 connected to an external sprocket to be driven through a flexible power transmission member connected to a crankshaft, a plurality of planetary gears 104 connected to one another through a planetary gear carrier and connected to the second rotatable shaft 24, such as a camshaft, and a sun gear 72, 172, 272 driven by an electric motor 76. The improvement of the coupling assembly 20, 120, 220 can include the second rotatable member 26, 126, 226 formed as a cylindrical hub portion of the second rotatable member, a plurality of springs 42, 142, 242 interposed between the cylindrical hub portion of the second rotatable member 26, 126, 226 and the first rotatable member 22, 122, 222, and a plurality of load-bearing surfaces 32 associated with the first rotatable member 22, 122, 222 and engageable by the plurality of springs 42, 142, 242. The cylindrical hub portion of the second rotatable member 26, 126, 226 can include an interior surface 28, 128, 228 for receiving the first rotatable member 22, 122, 222 and accommodating axial misalignment between the first rotatable member 22, 122, 222 and second rotatable member 26, 126, 226. The plurality of springs 42, 142, 242 can be interposed between the cylindrical hub portion of the second rotatable member 26, 126, 226 and the first rotatable member 22, 122, 222 and are operable for transferring torque from the first rotatable member 22, 122, 222 to the cylindrical hub portion of the second rotatable member 26, 126, 226 for driving the second rotatable shaft 24. Each of the plurality of springs 42, 142, 242 can have a first contact point 46a, 146a, 246a and a second contact point 46b, 146b, 246b and a flexible rectangular portion 48, 148, 248 extending between the first and second contact points. The plurality of springs 42, 142, 242 carry a spring force in shear between the first contact point 46a, 146a, 246a and the second contact point 46b, 146b, 246b such that rotational torque can be transferred from the first rotatable member 22, 122, 222 to the second rotatable member 26, 126, 226. The plurality of springs 42, 142, 242 can be operable for transferring torque between the first rotatable member and the cylindrical hub portion of the second rotatable member. A plurality of load-bearing surfaces 32 can accommodate radial clearances 34, 36; 134, 136, while providing rotational driving torque from the first rotatable member 22, 122, 222 to the cylindrical hub portion of the second rotatable member 26, 126, 226 through the plurality of springs 42, 142, 242. It should be recognized by one skilled in the art that the output shaft 54 could be an output shaft of an electric motor, gear reducer, actuator, or other primary power source. It should also be recognized by one skilled in the art that the second rotatable shaft 24 can be a phaser, fan, pump, pulley, or other device to be driven. It should be recognized that the output shaft 54 and second rotatable shaft 24 as described herein can be reversed without departing from the disclosure herein if desired.

Figure 5:
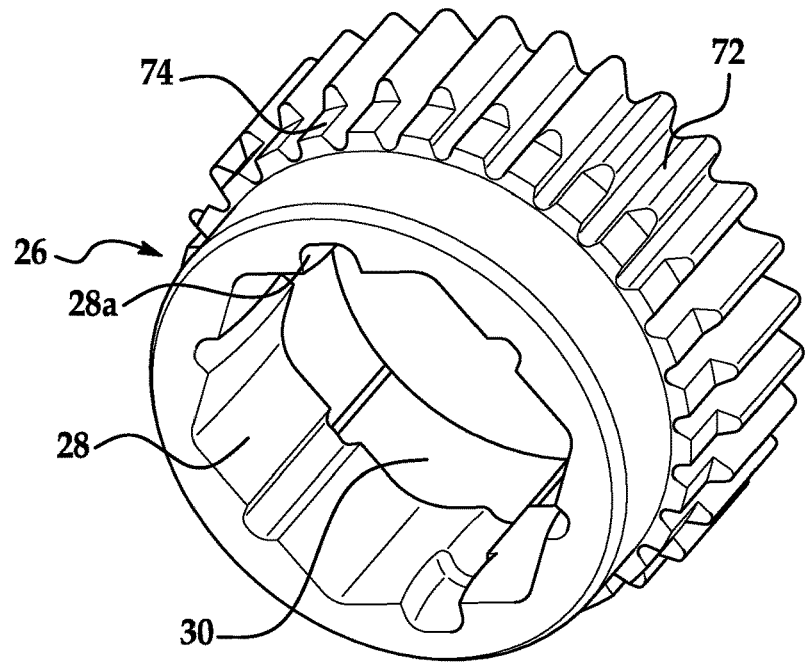
FIG. 5 is a perspective view of the cylindrical hub portion of the second rotatable member in FIG. 4.
Figure 6:
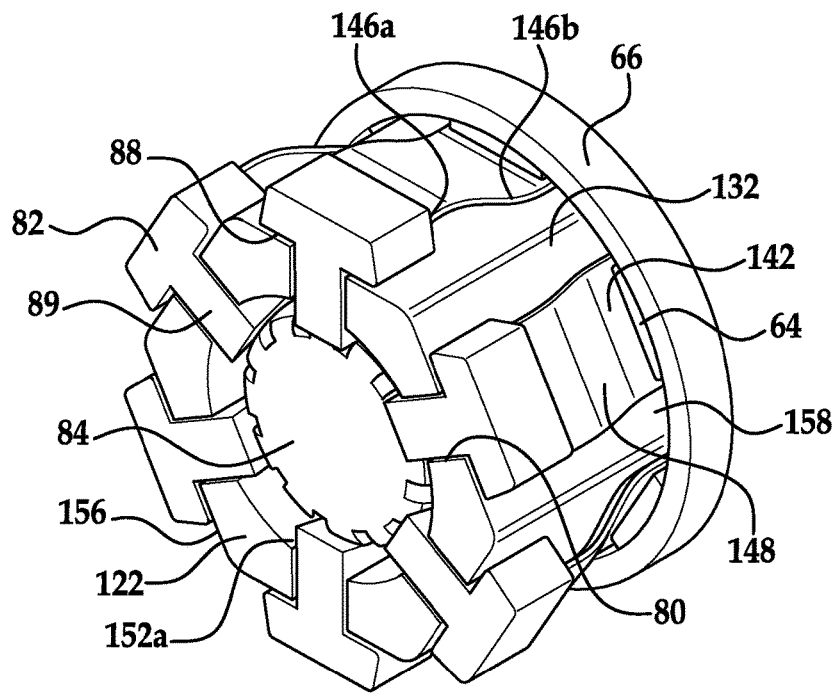
FIG. 6 is a perspective view of the first rotatable member illustrating a plurality of locking members and a hub slideable within the first rotatable member.
Figure 7:
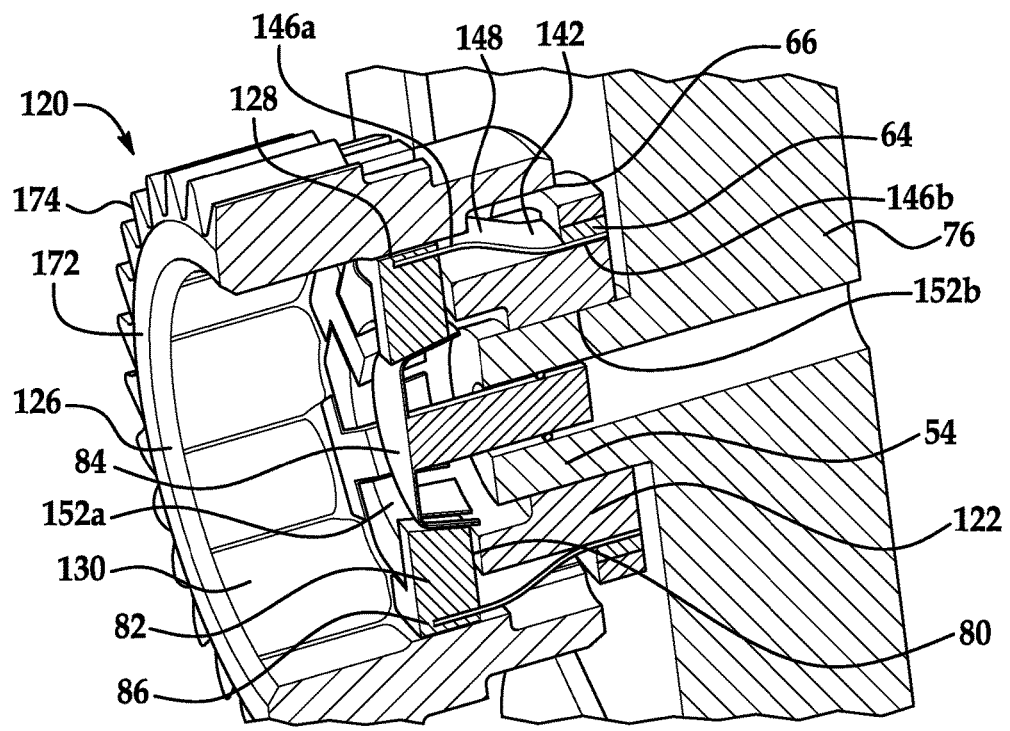
FIG. 7 is a cross sectional perspective view of the first rotatable member in FIG. 6 assembled to the second rotatable member in a coupling assembly.

Referring now to FIGS. 1-8, a coupling assembly 20, 120 can include a first rotatable member 22, 122 engageable with a cylindrical hub portion of a second rotatable member 26, 126 for coupling the first rotatable member 22, 122, such as a first shaft, to a second rotatable shaft 24, 124, providing for uniform rotation of the first rotatable member 22, 122 and the second rotatable shaft 24, 124 through a planetary gear system 100. As best illustrated in FIG. 1, in an internal combustion engine, the first rotatable member 22, 122 can be associated with an electric motor 76, or actuator for actuation of a rotatable phasing member operable for varying a phase relationship between a crankshaft and camshaft located in an internal combustion engine. The cylindrical hub portion of the second rotatable member 26, 126 can include an interior surface 28, 128 for receiving the first rotatable member 22, 122 and a second interior surface 30, 130 for non-operative encircling of a free end of the second rotatable shaft 24. The second rotatable member 24 can include the camshaft and can be connected to the planetary gears 104 driven by the ring gear 102 and sun gear 72, 172 as best seen in the combination of FIGS. 1-8 in combination with FIG. 9. As best illustrated in FIG. 7, the first rotatable member 22, 122 can include at least one inner surface 52, 152a, 152b for receiving a third rotatable shaft 54, 154 rotatable by the electric motor 76. The coupling assembly 20, 120 can include a plurality of springs 42, 142 interposed between the interior surface 28, 128 of the cylindrical hub portion of the second rotatable member 26, 126 and the first rotatable member 22, 122. It should be recognized by those skilled in the art that the first rotatable member 22, 122 structure can be formed integrally as part of a driving shaft 54, such as a shaft 54 of an electric motor 76, or can be formed as a separate adapter, coupler, or coupling assembly 20, 120, 220 engageable with the driving shaft, such as a shaft of an electric motor to accommodate manufacturing tolerances, radial and axial, as well as axial misalignments between the shaft of an electric motor and the sun gear to be driven as part of an electric phase assembly including a planetary gear system for driving a camshaft of an internal combustion engine.

Referring now to FIGS. 1-3, the first rotatable member 22 can include at least one inner surface 52 for receiving a third rotatable shaft 54, a first end 56, a second end 58, and a plurality of load-bearing surfaces 32 extending axially between the first and second ends 56, 58. The first rotatable member 22 can be rotatable about a longitudinal primary axis and the second rotatable member 26 can be rotatable about a longitudinal secondary axis. The first end 56 can include an enlarged dimension flange having a plurality of radially spaced, generally flat, peripheral surfaces 60 positioned radially outward with respect to the plurality of load-bearing surfaces 32 creating a stepped dimension along the axial length of the first rotatable member 22 between the first end 56 and second end 58. The plurality of load-bearing surfaces 32 can be generally flat and generally rectangular in shape.

By way of example and not limitation, the first rotatable member 22 as illustrated in FIGS. 1-3 can include six load-bearing surfaces such that the first rotatable member 22 has a generally hexagonal shape. The plurality of load-bearing surfaces 32 can accommodate a first radial clearance 34 between the cylindrical hub portion of the second rotatable member 26 and the first rotatable member 22. The plurality of raised peripheral surfaces 60 can be generally flat and generally rectangular in shape. The plurality of radially spaced peripheral surfaces 60 can accommodate a second radial clearance 36 between the cylindrical hub portion of the second rotatable member 26 and the first rotatable member 22. The plurality of radially spaced peripheral surfaces 60 can include a plurality of toothed stops 62 with one toothed stop 62 centered on each one of the plurality of radially spaced peripheral surfaces 60. Each of the plurality of toothed stops 62 can extend radially outward into a corresponding complementary limit stop receiving groove 28a of the second rotatable member 26. The plurality of toothed stops 62 and complementary grooves 28a limit the degree of relative rotation between the first and second rotatable members 22, 26 to rotationally lock the first and second rotatable members 22, 26 with respect to one another while permitting movement to accommodate axial misalignment and build of manufacturing and assembly tolerances.

Each of the plurality of springs 42 can correspond to and engage one of the plurality of load-bearing surfaces 32. Each of the plurality of springs 42 can include a leaf spring having a flexible rectangular portion 48 for transferring rotational torque from the first rotatable member 22 to the cylindrical hub portion of the second rotatable member 26. Each of the plurality of springs 42 can include a first contact point 46a and second contact point 46b. The first contact point 46a can be located at the first end 56 of the first rotatable member 22 adjacent to a stepped shoulder formed between the plurality of radially spaced peripheral surfaces 60 and the plurality of load-bearing surfaces 32. The second contact point 46b can be located adjacent the second end 58 of the first rotatable member 22. The flexible rectangular portion 48 of each of the plurality of springs 42 can extend between the first and second contact point 46*a*, 46*b*. As best illustrated in FIG. 2, the first rotatable member 22 can include a retaining ring 66 and a retainer clip 70. The retaining ring 66 can be located about the primary axis and secured adjacent to the second end 58 of the first rotatable member 22. As best illustrated in FIG. 3, the second end 58 can include a plurality of grooves 68 disposed about a periphery of the second end 58. The retaining ring 66 can prevent axial movement of the plurality of springs 42. The retaining ring 66 can be formed on the first rotatable member 22. The retainer clip 70 can be a unitary body anchoring each of the plurality of springs 42 to one of the plurality of load-bearing surfaces 32 at the second contact point 46*b*. A portion of each of the plurality of springs 42 can extend between the retainer clip 70 and the retaining ring 66. The retainer clip 70 can be formed of a stamped material. The retainer clip 70 and the plurality of springs 42 can be preassembled and formed of a stamped material for placement on the plurality of load-bearing surfaces 32. The flexible rectangular portion 48 of each of the plurality of springs 42 can engage the interior surface 28 of the cylindrical hub portion of the second rotatable member 26 for transferring torque from the first rotatable member 22 to the cylindrical hub portion of the second rotatable member 26.

Referring now to FIGS. 4-5, a cylindrical hub portion of the second rotatable member 26 can include a first interior surface portion 28 and a second interior surface portion 30 longitudinally adjacent to one another. An external sun gear 72 can be associated with, i. e. formed on or connected to, an external surface of the cylindrical hub portion of the second rotatable member 26. It should be recognized by those skilled in the art that the cylindrical hub portion of the second rotatable member 26 can be integrally formed as part of, or assembled into a pulley, a sprocket, a hub, a shaft member, and any combination thereof. As best illustrated in FIG. 5, the interior surface portion 28 can have a shape complementarily corresponding to the shape of the enlarged flange portion of the first rotatable member 22. By way of example and not limitation, the second interior surface portion 30 can non-operatively encircle the second rotatable shaft 24, while the second rotatable shaft 24 can be connected to a planetary gear carrier to be driven in rotation through the planetary gears and planetary gear carrier. It should be recognized by those skilled in the art that alternative configurations and shaft connections between a planetary gear assembly and motor are possible, and such alternative configurations and shaft connections are considered to be within the purview and scope of coupling assembly disclosed herein. As best illustrated in FIG. 4, when the first rotatable member 22 is assembled in the cylindrical hub portion of the second rotatable member 26, the plurality of load-bearing surfaces 32 can accommodate a radial clearance 36 located between the plurality of teeth 62 of the enlarged flange portion of the first rotatable member 22 and the interior surface 28 of the second rotatable member 26, and can further accommodate a radial clearance 34 located between the load-bearing surfaces 32 of the first rotatable member 22 and the interior surface 28 of the cylindrical hub portion of the second rotatable member 26. The radial clearance 34 operably provides space where leaf springs 42 are located to assist in torque and load transfer between the first and second rotatable members 22, 26, while accommodating misalignments and build up of tolerances. The plurality of teeth 62 and the leaf springs 42 can be assembled such that the first rotatable member 22 is centered within the cylindrical hub portion of the second rotatable member 26. In other words, the first radial clearance 34 can be defined between the interior surface 28 and the plurality of load-bearing surfaces 32, while the second radial clearance 36 can be defined between each of the plurality of teeth 62 and the interior surface 28 of the cylindrical hub portion of the second rotatable member 26. The second radial clearance 36 can be large enough to accommodate misalignment without binding the first rotatable member 22 and the second rotatable member 26. The circumferential clearance or second radial clearance 36 can define the amount of spring-loaded travel present in the coupling assembly 20 to provide a limit to the amount of load on the plurality of springs 42.

In operation, the first rotatable member 22 can be rotatable by an electric motor 76, such that the plurality of teeth 62 and the plurality of springs 42 engage with the interior surface 28 of the cylindrical hub portion of the second rotatable member 26 and rotationally lock the cylindrical hub portion of the second rotatable member 26 for a direct drive relationship with the first rotatable member 22. When the first rotatable member 22 and the cylindrical hub portion of the second rotatable member 26 are locked for rotation, the plurality of load-bearing surfaces 32 can transfer rotational driving torque from the first rotatable member 22 to drive the second rotatable member 24 through the load-bearing surfaces 32 contacting the leaf springs 42 and through the plurality of teeth 62.

In an internal combustion engine, the sun gear 72 can be coupled for rotation with a phaser including a planetary gear transmission system. The sun gear 72 can have teeth 74 formed on an exterior surface engageable with a plurality of planetary gears 104 driven by a ring gear 102 having a sprocket connected thereto to be driven by connection to a crankshaft of an internal combustion engine. The phaser can be driven in rotation by the crankshaft, while phase change rotation, either advancing or retarding motion, can be driven by the sun gear for varying a phase angle relationship between the camshaft driven by the crankshaft.

Referring now to FIGS. 6-8, the coupling assembly 120 can include a first rotatable member 122, a cylindrical hub portion of the second rotatable member portion of a second rotatable member 126, a plurality of springs 142 interposed between the cylindrical hub portion of the second rotatable member 126 and the first rotatable member 122, and a plurality of locking members 82 interposed between the cylindrical hub portion of the second rotatable member 126 and the first rotatable member 122. As best illustrated in FIGS. 6-7, the first rotatable member 122 can include a plurality of load-bearing surfaces 132, a first inner surface 152*a* for receiving a central hub 84 operably associated with the plurality of locking members 82, and a second inner surface 152*b* for receiving a first rotatable shaft 54. The plurality of load-bearing surfaces 132 can be generally flat and generally rectangular in shape, extending between a first end 156 and a second end 158 of the first rotatable member 122. By way of example and not limitation, the first rotatable member 122 can include six load-bearing surfaces 132, such that the first rotatable member 122 has a generally hexagonal shape. In an internal combustion engine, the first rotatable member 122 can be associated with an output shaft 54 of an electric motor 76, operating as an actuator for an electric phaser. As illustrated in FIG. 7, the first rotatable member 122 can be assembled to the first rotatable shaft 54 extending from the electric motor 76. It should be recognized by those skilled in the art, that it is also contemplated that the first rotatable member 122 portion of the coupling 120 can be formed integrally as part of the first drive shaft 54 connected directly to the electric motor 76, or can be formed independently as an adapter or coupling fitting to be placed between a shaft supporting the sun gear of the phaser and the first shaft 54 of the electric motor 76, or can be formed integrally as part of the shaft supporting the sun gear with the second rotatable member 126 formed integrally or separately from the first shaft 54 of the electric motor 76.

The first rotatable member 122 can include a plurality of recesses 80 defined by the plurality of load-bearing surfaces 132 and supporting each of the plurality of locking members 82. Each of the plurality of recesses 80 can be located at the first end 156 of the first rotatable member 122, centrally located on a corresponding one of the plurality of load-bearing surfaces 132. Each of the plurality of recesses 80 can extend through the first rotatable member 122 to the first inner surface 152a and can receive one of the plurality of locking members 82. Each of the plurality of locking members 82 can include a seating surface 88 engageable with one of the plurality of load-bearing surfaces 132. A leaf spring 142 can be provided for each of the plurality of locking members 82. Each leaf spring 142 can have a first contact point 146a and a second contact point 146a. As best illustrated in FIG. 7, each of the plurality of locking members 82 can include a slot 86 for receiving a first contact point 146a end portion of a corresponding one of the plurality of springs 142.

When assembled within the slot 86, each of the plurality of springs 142 can be cantilevered downwardly from one of the plurality of locking members 82 to the first rotatable member 122 and secured to the first rotatable member 122 at the second contact point 146b. A retaining ring 66 can secure the second contact point 146b to the corresponding one of the plurality of load-bearing surfaces 132. The retaining ring 66 can include a friction surface 64 to fixedly secure the corresponding one of the plurality of springs 142 to the retaining ring 66. By way of example and not limitation, the plurality of springs 142 can be formed of a stamped material and the retaining ring 66 can be formed integrally with the first rotatable member 122. By way of example and not limitation, the plurality of springs 142 can be formed as a plurality of plate springs. In operation, each of the plurality of springs 142 can include a flexible rectangular portion 148 extending between the first and second contact points 146a, 146b for transferring torque from the first rotatable member 122 and to bias a corresponding one of the plurality of locking members 82 radially outwardly against an inner surface 128 of the cylindrical hub portion of the second rotatable member 126. The coupling assembly 120 can include a central hub 84 slideable within the first inner surface 152a of the first rotatable member 122. By way of example and not limitation, each of the plurality of locking members 82 can alternatively include a tapered surface engageable with the inner surface 128 of the cylindrical hub portion of the second rotatable member 126, such that the plurality of locking members 82 can be wedged between the first and second rotatable member 122, 126 in response to insertion of the central hub 84 during assembly. By way of example and not limitation, the tapered surfaces of the plurality of locking members 82 can be engaged with the cylindrical hub portion of the second rotatable member 126 in response to being radially biased outwardly by the plurality of springs 142. In other words, the tapered surfaces of the plurality of locking members 82 can be driven into engagement with the second rotatable member 126 in response to spring biasing force from springs 142, or by engagement with central hub 84, or any combination thereof. The tapered surface located on each of the plurality of locking members 82 can prevent backlash within the coupling assembly 120 during operation.

As best illustrated in FIG. 6, each of the plurality of locking members 82 can include a stem 89 for insertion within the corresponding one of the plurality of recesses 80, where a clearance between the stem 89 and corresponding recess 80 limits the amount of torque carried directly by the plurality of springs 142. A radially inner end of each stem 89, corresponding to one of the plurality of locking members 82, can engage the central hub 84, such that each of the plurality of locking members 82 can be connected to the central hub 84 and radially inward movement of the locking members 82 is limited by the radially inner end of each stem 89 and is limited by the engagement of the seating surface 88 with the load-bearing surface 132 of the first rotatable member 122. The central hub 84 and the plurality of locking members 82 connected to the central hub 84 can be slideable within the first rotatable member 122 providing for ease of assembly. The central hub 84 can be slideable within the first rotatable shaft 54 if the first rotatable shaft 54 is configured with an inner surface for receiving the central hub 84 as illustrated in FIG. 7. As illustrated in FIG. 6, by way of example and not limitation, the central hub 84 can be held in place between the stems 89. The central hub 84 can also be held in place by a detent, a snap ring, or by at least one additional press fit or threaded insert.

As illustrated in FIG. 8, the cylindrical hub portion of the second rotatable member 126 can include an interior surface 128 engageable with the plurality of locking members 82. As best seen in FIG. 7, a second interior surface 130 of the second rotatable member 126 can be located within a sun gear 172 portion of the second rotatable member. The second interior surface 130 can non-operably encircle the second rotatable shaft 24, which is connected to the planetary gears 104 through a planetary gear carrier to be driven in rotation therewith as shown schematically in FIG. 9. As best illustrated in FIG. 8, when the first rotatable member 122 is assembled in the cylindrical hub portion of the second rotatable member 126, the plurality of load-bearing surfaces 132 can accommodate a first radial clearance 134 defined between the interior surface 128 and the plurality of load-bearing surfaces 132. The first radial clearance 134 provides space for insertion and anchoring of the leaf or plate springs 142 providing transmission of torque and rotation to the second rotatable member 126 while allowing for misalignment and build up of tolerances between the first rotatable member 122 and the second rotatable member 126. The plurality of locking members 82 can accommodate a second radial clearance 136 defined between each radially outer end of the plurality of locking members 82 and the interior surface 128 during rotation of the first rotatable member 122.

In operation in an internal combustion engine, the first rotatable member 122 can be rotatable by the electric motor 76 and the plurality of locking members 82 can be biased against the cylindrical hub portion of the second rotatable member 126 by the plurality of springs 142, effectively locking the cylindrical hub portion of the second rotatable member 126 for rotation with the first rotatable member 122. When the first rotatable member 122 and the cylindrical hub portion of the second rotatable member 126 are locked for rotation by the plurality of locking members 82 with the plurality of springs 142, the plurality of load-bearing surfaces 132 can transfer rotational driving torque from the first rotatable member 122 to drive the second rotatable shaft 124 through the planetary gear train including a sun gear 172 having teeth 174, a plurality of planetary gears 104 supported by a planetary gear carrier connected to the second rotatable shaft 124, and a ring gear 102. In the engine, the sun gear 172 can be coupled for rotation with a phaser through for operative adjusting the phase angle of the camshaft with respect to the crankshaft of the engine. The sun gear 172 can have a plurality of teeth 174 engageable with a plurality of planetary gears 104 supported by a planetary gear carrier connected to the second rotatable shaft 124, while the ring gear 102 includes a sprocket connected with a flexible power transmission member to the crankshaft to be driven in rotation by rotation of the crankshaft. The phaser varies a phase angle relationship between a camshaft and a crankshaft of the engine. The crankshaft can be driven by the internal combustion engine, which in turn is operatively connected to drive the camshaft. As illustrated in FIG. 7, the plurality of springs 142 can be formed on or connected to the plurality of locking members 82, such that the plurality of springs 142 can be formed by a stamping operation and the plurality of locking members 82 can be formed on to the stamped springs 142 or insertably connected to the stamped springs 142, prior to assembly of the coupling 120.

Referring now to FIGS. 10A-12, the coupling assembly 220 can include a first rotatable member 222, a cylindrical hub portion of the second rotatable member portion of a second rotatable member 226, and a plurality of springs 242 interposed between the cylindrical hub portion of the second rotatable member 226 and the first rotatable member 222. In an internal combustion engine, the first rotatable member 222 can be coupled to an electric motor or actuator. The first rotatable member 222 can include a plurality of load-bearing surfaces 232 formed with generally flat and generally rectangular shape. By way of example and not limitation, the first rotatable member 222 can include six load-bearing surfaces, such that the first rotatable member 222 has a generally hexagonal shape. The cylindrical hub portion of the second rotatable member 226 can include a sun gear 272 having a plurality of teeth 274. As illustrated in FIG. 10A, FIGS. 11 and 12 are cross sections of the coupling assembly 220 taken at different angular orientations with respect to the rotational axis of the sun gear 272. In an internal combustion engine, the sun gear 272 can be coupled for rotation with an electrically driven phaser 92 including a plurality of planetary gears 104 connected by a planetary gear carrier to a second shaft 24, and a ring gear 102 having an external sprocket to be driven by a crankshaft. As best illustrated in FIG. 10B, the sun gear 272 of the phaser 92 can include a plurality of limit stops 94 located on an exterior surface 98 of the sun gear 272. The phaser 92 can be rotatable with respect to a housing for varying a phase relationship between a camshaft driven by a crankshaft. The plurality of limit stops 94 can engage within corresponding complementary limit grooves or notches located on the housing for allowing limited angular rotation of the camshaft with respect to the crankshaft to vary the opening and closing of a plurality of valves located in the internal combustion engine. It should be recognized by those skilled in the art that the present invention can be used in various configurations of the electrically driven phaser 92. By way of example and not limitation, the electrically driven phaser 92 can include an electric motor driving a worm gear that operates a simple planetary gearset. The electrically driven phaser 92 can also include a compounded planetary gearset including multiple ring gears for connection with a sprocket and camshaft. Other electrically driven phaser configurations can include various geared mechanisms such as cycloidal gears, harmonic drive, and large offset gears such that planetary gear carrier can be driven by an electric motor.

It should be recognized by those skilled in the art that various phaser, pump, and actuator designs can be employed with the coupling assembly 20, 120, 220 without departing from the spirit or scope of the present invention. The plurality of springs 242 can include a first contact point 246a and a second contact point 246b. The plurality of springs 242 carry a spring force in shear between the first and second contact point 246a, 246b, such that rotational torque can be transferring between the first rotatable member 222 and the second rotatable member 226. The springs 242 can be formed of a stamped material. The plurality of springs 242 can include plate springs or leaf springs. The cylindrical hub portion of the second rotatable member 226 can include a plurality of spring-receiving apertures 96 located on an interior surface 228 of the cylindrical hub portion of the second rotatable member 226. The plurality of spring-receiving apertures 96 can correspond to the plurality of springs 242. Each of the plurality of springs 242 can include a first contact point 246a and a second contact point 246b located adjacent a first longitudinal end 96a and a second longitudinal end 96b of each of the plurality of spring-receiving apertures 96. Each of the plurality of springs 242 can include a flexible rectangular portion 248 extending between the first and second contact points 246a, 246b and outwardly arched towards the plurality of load-bearing surfaces 232, engageable with the plurality of load-bearing surfaces 232 for transferring rotational torque from the first rotatable member 222 to the cylindrical hub portion of the second rotatable member 226. As illustrated in FIG. 10B, the first rotatable member 222 can also include an inner surface 252 for non-operatively encircling a second rotatable shaft 24 during assembly of the coupling assembly 220. The second rotatable shaft 24 connected to a planetary gear carrier for the planetary gears 104 interposed between the ring gear 102 and sun gear 272 of the planetary gear drive system schematically shown in FIGS. 9-10A. In an internal combustion engine, the second rotatable shaft 24 can include a camshaft.

Figure 13:
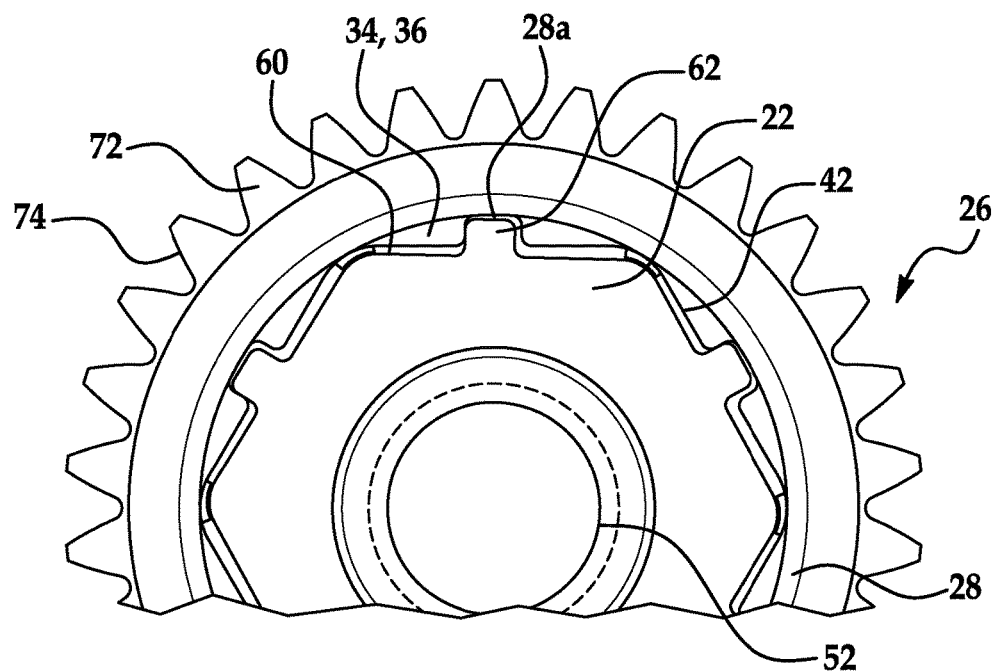
FIG. 13 is a detailed end view of FIG. 4 illustrating a plurality of toothed stops disposed about the first rotatable member and biased by leaf springs against the cylindrical hub for reducing or eliminating free backlash.

Referring now to FIG. 13, a first rotatable member 22 similar to that shown in FIG. 4, while being spring biased to urge teeth 62 to one side of the corresponding complementary groove 28a (i.e. not centered as shown in FIG. 4) is illustrated in detail. The first rotatable member 22 is assembled in the cylindrical hub portion of the second rotatable member 26, the plurality of load-bearing surfaces 32 (no shown in FIG. 13) can accommodate a radial clearance 36 located between the plurality of teeth 62 of an enlarged flange portion of the first rotatable member 22 and the interior surface 28 of the second rotatable member 26, and can further accommodate a radial clearance 34 located between the load-bearing surfaces 32 of the first rotatable member 22 and the interior surface 28 of the cylindrical hub portion of the second rotatable member 26. The radial clearance 34 operably provides space where leaf springs 42 are located to assist in torque and load transfer between the first and second rotatable members 22, 26, while accommodating misalignment and build up of tolerances between the driving shaft and the driven shaft. In other words, the first radial clearance 34 can be defined between the interior surface 28 and the plurality of load-bearing surfaces 32, while the second radial clearance 36 can be defined between each of the plurality of teeth 62 and the interior surface 28 of the cylindrical hub portion of the second rotatable member 26. Each of the plurality of stops or teeth 62 can extend radially outward into a corresponding complementary limit stop receiving groove 28a of the second rotatable member 26. In assembly, the plurality of springs 42 can load each of the plurality of stops or teeth 62 against one side of the corresponding receiving grooves 28a for eliminating free backlash. In operation, the first rotatable member 22 can be rotatable by an electric motor 76, such that the plurality of teeth 62 and the plurality of springs 42 are locked with the interior surface 28 of the cylindrical hub portion of the second rotatable member 26 for a direct drive relationship with the first rotatable member 22. When the first rotatable member 22 and the cylindrical hub portion of the second rotatable member 26 are locked for rotation, the plurality of load-bearing surfaces 32 can transfer rotational driving torque from the first rotatable member 22 to drive the second rotatable member 24 through the load-bearing surfaces 32 contacting the leaf springs 42 and through the plurality of teeth 62. It should be recognized by those skilled in the art that the first and second rotatable members 22, 26 can be biased with respect to one another, such that the teeth 62 are biased toward a centered position with respect to the receiving groove 28a, or are biased into engagement with one sidewall of the corresponding receiving groove 28a. If off-centered biasing into engagement with one sidewall of the receiving groove 28a is desired, one of the first and second rotatable members 22, 26 can be rotated relative to the other during assembly to preload the plurality of springs 42 in a predetermined rotational direction.

Figure 14:
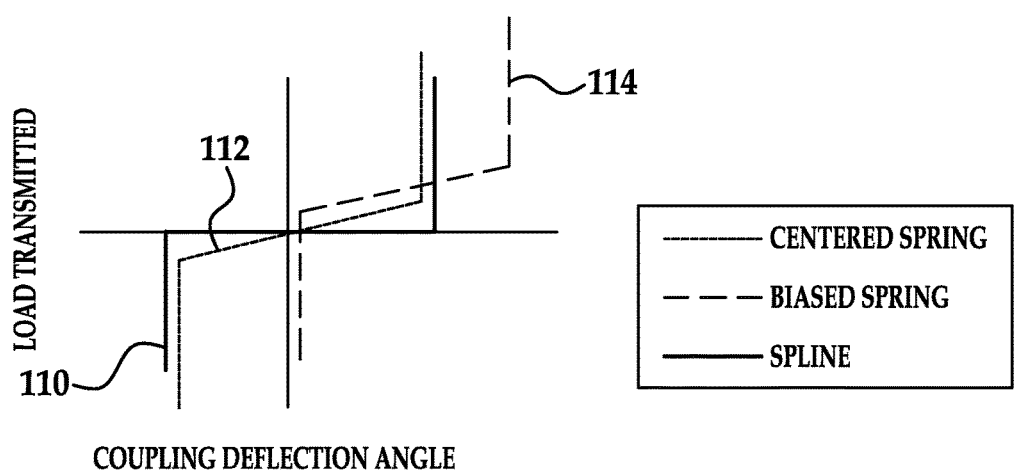
FIG. 14 is a graph comparing the coupling deflection angle on the X-axis versus the load transmitted on the Y-axis for a centered spring as shown in FIG. 4, a biased spring as shown in FIG. 13, and a spline connection not including a spring.
Figure 15A:
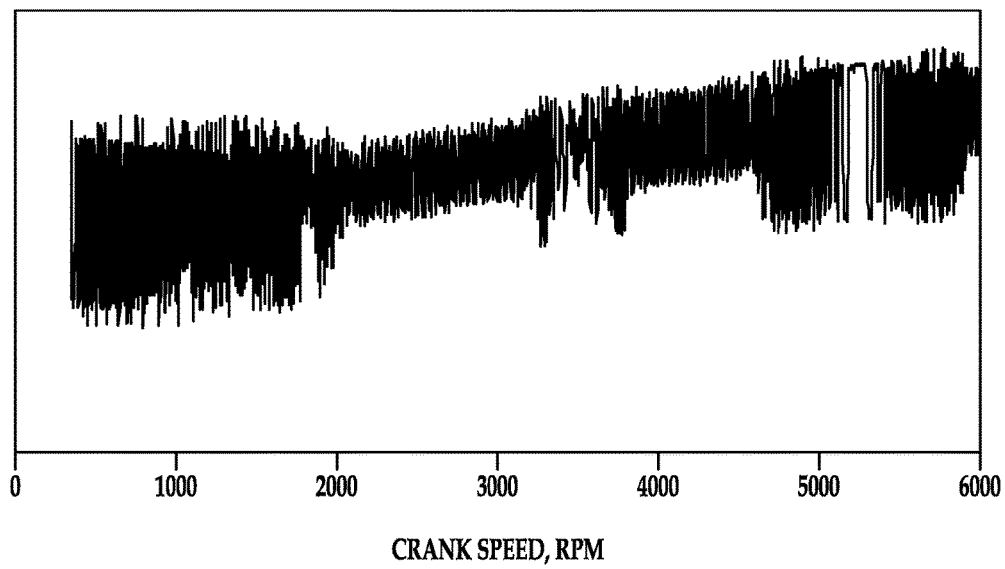
FIG. 15A is a graph of the coupling deflection as a function of the crankshaft speed in revolutions per minute (rpm) for a centered spring.
Figure 15B:
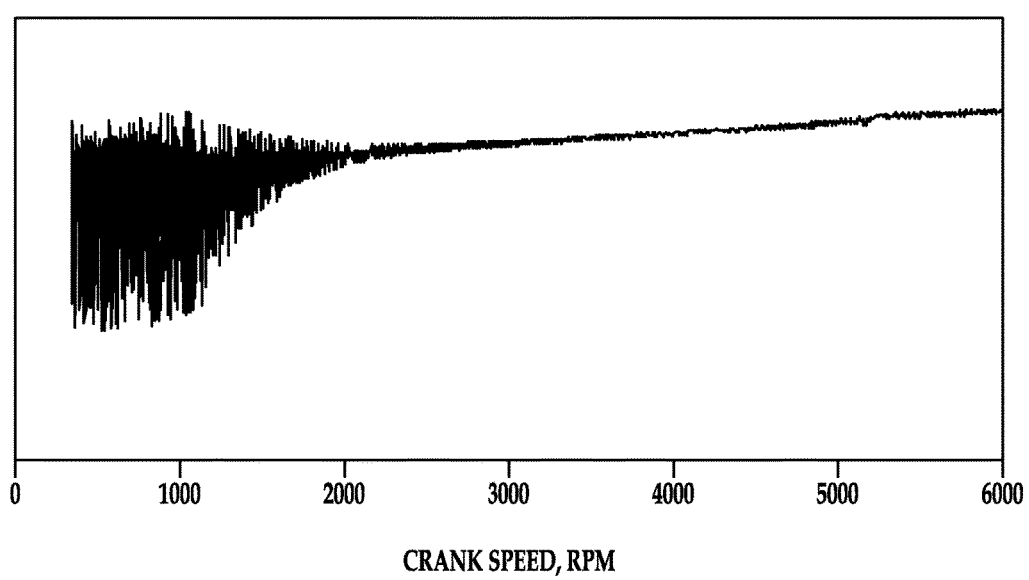
FIG. 15B is a graph of the coupling deflection as a function of the crankshaft speed in revolutions per minute (rpm) for a biased spring illustrating smaller deflection with respect to the centered spring of FIG. 15A at speeds greater than approximately 1500 rpm.

Referring now to FIG. 14, a coupling deflection angle is graphed on an X-axis relative a load transmitted, or torque applied to the coupling assembly, on a Y-axis to compare a coupling assembly having a splined first rotatable member 22 (not shown) as shown by graph line 110, a centered first rotatable member 22 as illustrated in FIG. 4 as shown by graph line 112, and a coupling assembly having the first rotatable member 22 biased against the cylindrical hub portion as illustrated in FIG. 13 as shown by graph line 114. As illustrated in FIG. 14, the coupling deflection angle can be measured by the angle of deflection of the first rotatable member 22 with respect to the cylindrical hub portion of the second rotatable member 26 when the load applied to the coupling assembly is reversed. The coupling assembly having a splined first rotatable member 22 and not using springs 42 transmits zero load during an angle change at load reversal as shown with graph line 110. A coupling assembly having a centered plurality of springs 42 can transmit some load during an angle change at load reversal as illustrated in graph line 112. The coupling assembly having plurality of springs 42 and the plurality of teeth 62 biased against the cylindrical hub portion when assembled can transmit load without an angle change at load reversal as illustrated in graph line 114. As further illustrated in FIGS. 15A-15B, the coupling deflection angle shown on the Y-axis can be compared relative to the speed of a crankshaft shown on the X-axis. As the crankshaft speed increases, the coupling assembly with the centered spring illustrated in the graph of FIG. 15A has a continuous relatively wide spread of coupling deflection over a full range of crankshaft speeds. Whereas, the coupling assembly with a biased spring configuration as illustrated in FIG. 15B has a substantially decreased spread of coupling deflection over a range of crankshaft speeds greater than approximately 1500 rpm. This result is associated with reduced vibration and noise associated with the coupling assembly. It should be recognized by those skilled in the art that increasing the spring bias can eliminate or reduce the deflection spread at lower speeds with respect to the lighter spring bias illustrated in FIGS. 14-15B.

Figure 16:
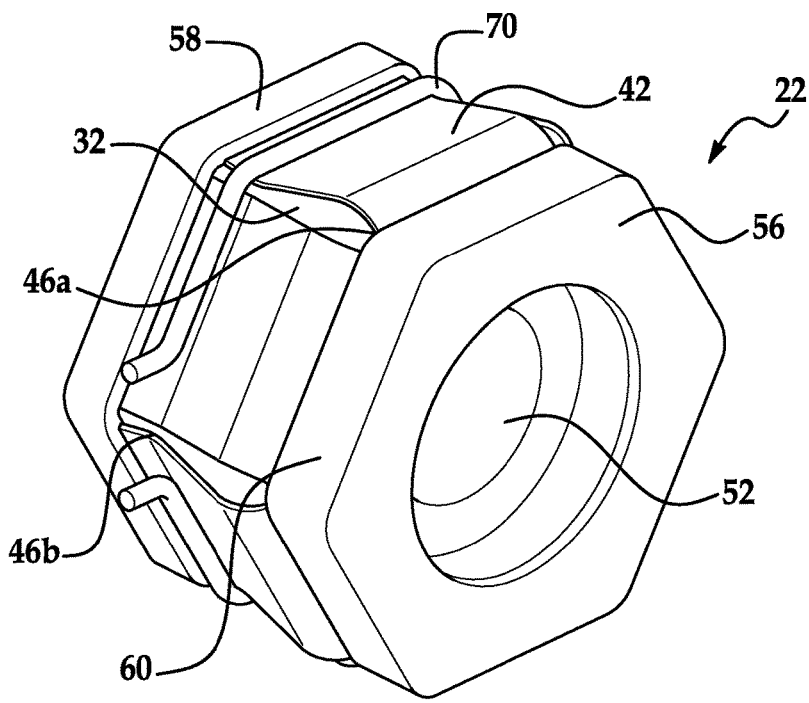
FIG. 16 is a perspective view of a first rotatable member illustrating raised peripheral surfaces at a first end and a second end of the first rotatable member.
Figure 17:
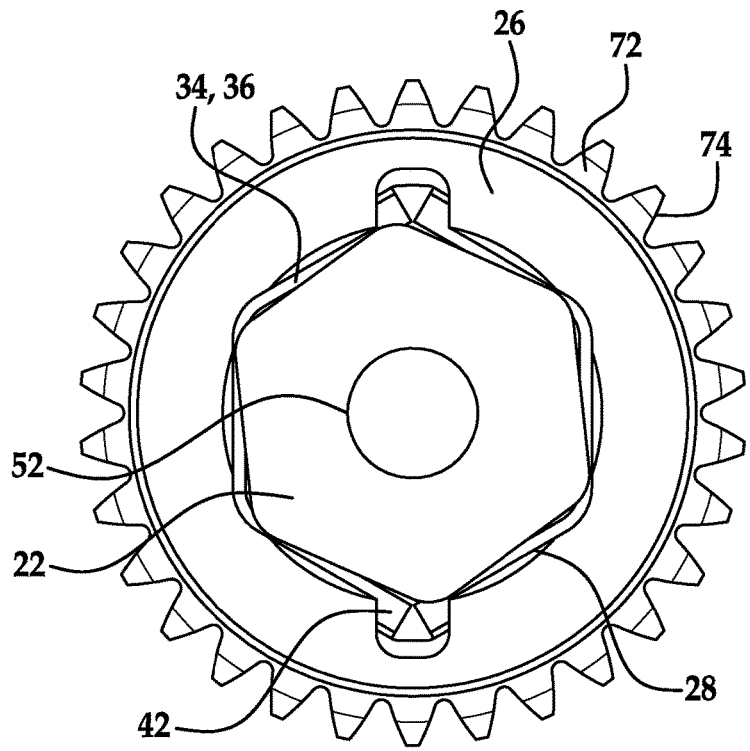
FIG. 17 is an end view of a coupling assembly illustrating the first rotatable member shown in FIG. 16 located in a cylindrical hub portion of a second rotatable member.

Referring now to FIGS. 16-17, the first rotatable member 22 can include at least one inner surface 52 for receiving a third rotatable shaft 54, a first end 56, a second end 58, and a plurality of load-bearing surfaces 32 extending axially between the first and second ends 56, 58. The first rotatable member 22 can be rotatable about a longitudinal primary axis and the second rotatable member 26 can be rotatable about a longitudinal secondary axis. The first end 56 and second end 58 can each include an enlarged dimension flange having a plurality of radially spaced, generally flat, peripheral surfaces 60 positioned radially outward with respect to the plurality of load-bearing surfaces 32 creating a stepped dimension along the axial length of the first rotatable member 22 between the first end 56 and second end 58. The plurality of load-bearing surfaces 32 can be generally flat and generally rectangular in shape. By way of example and not limitation, the first rotatable member 22 as illustrated in FIGS. 16-17 can include six load-bearing surfaces such that the first rotatable member 22 has a generally hexagonal shape. The plurality of load-bearing surfaces 32 can accommodate a first radial clearance 34 between the cylindrical hub portion of the second rotatable member 26 and the first rotatable member 22. The plurality of raised peripheral surfaces 60 can be generally flat and generally rectangular in shape. The plurality of radially spaced peripheral surfaces 60 can accommodate a second radial clearance 36 between the cylindrical hub portion of the second rotatable member 26 and the first rotatable member 22. The plurality of radially spaced peripheral surfaces 60 limit the degree of relative rotation between the first and second rotatable members 22, 26 to rotationally lock the first and second rotatable members 22, 26 with respect to one another while permitting more movement than the first rotational member 22 shown having a plurality of teeth in FIGS. 2-4 to accommodate axial misalignment and build up of manufacturing and assembly tolerances.

As best illustrated in FIG. 16, each of the plurality of springs 42 can correspond to and engage one of the plurality of load-bearing surfaces 32. Each of the plurality of springs 42 can include a leaf spring having a flexible rectangular portion 48 for transferring rotational torque from the first rotatable member 22 to the cylindrical hub portion of the second rotatable member 26. Each of the plurality of springs 42 can include a first contact point 46a and second contact point 46b. The first contact point 46a can be located at the first end 56 of the first rotatable member 22 adjacent to a stepped shoulder formed between the plurality of radially spaced peripheral surfaces 60 and the plurality of load-bearing surfaces 32. The second contact point 46b can be located adjacent the second end 58 of the first rotatable member 22. The flexible rectangular portion 48 of each of the plurality of springs 42 can extend between the first and second contact point 46a, 46b. The first rotatable member 22 can include a retaining ring 66. The retaining ring 66 can be located about the primary axis and secured adjacent to the second end 58 of the first rotatable member 22. The retaining ring 66 and the enlarged dimension flange located at the second end 58 can prevent axial movement of the plurality of springs 42. The enlarged dimension flange and the retaining ring 66 can be formed on the first rotatable member 22. The retainer clip 70 can be a unitary body anchoring each of the plurality of springs 42 to one of the plurality of load-bearing surfaces 32 at the second contact point 46b. A portion of each of the plurality of springs 42 can extend outwardly toward the second end 58 of the first rotatable member 22 from the retaining clip 70. The retainer clip 70 can be formed of a stamped material. The retainer clip 70 and the plurality of springs 42 can be preassembled and formed of a stamped material for placement on the plurality of load-bearing surfaces 32. The plurality of springs 42 can be formed having an inherent spring bias by using varying spring height, curvature, or end constraint. The flexible rectangular portion 48 of each of the plurality of springs 42 can engage the interior surface 28 of the cylindrical hub portion of the second rotatable member 26 for transferring torque from the first rotatable member 22 to the cylindrical hub portion of the second rotatable member 26. As best illustrated in FIG. 17, when assembled, the first rotatable member 22 can limit the angular deflection and the spring load applied against the plurality of springs 42. It should be recognized by those skilled in the art that the plurality of radially spaced peripheral surfaces 60 can also be formed angularly offset, or with a non-linear or non-planar surface, with respect to the plurality of load-bearing surfaces 32 creating obstructions for engagement between the first and second rotatable members 22, 26 limiting relative rotation therebetween and limiting spring load applied against the plurality of springs 42.

Figure 18:
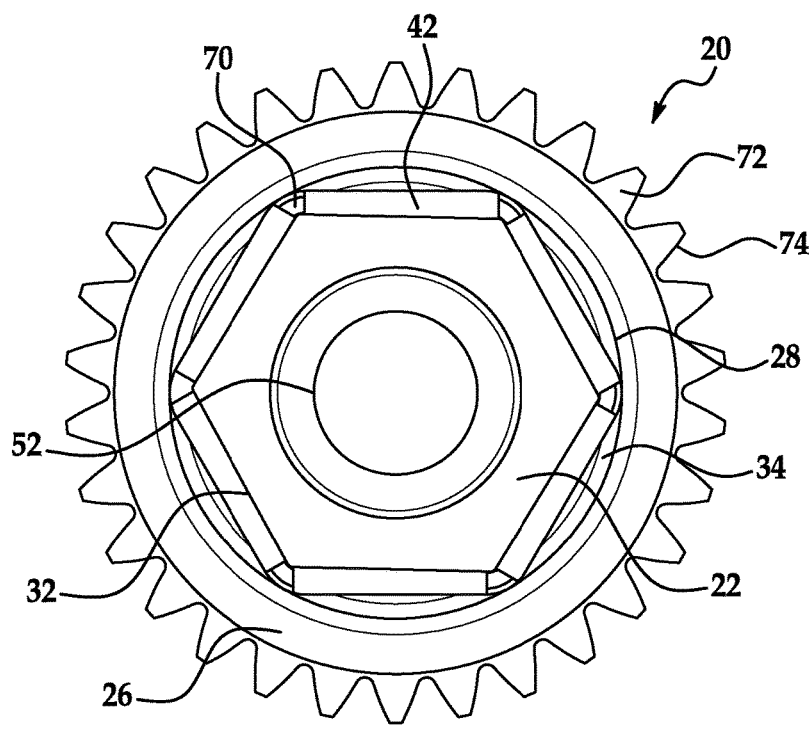
FIG. 18 is an end view of a coupling assembly illustrating a first rotatable member located in a cylindrical hub portion of a second rotatable member and having a load-bearing surface defining a radial clearance between the cylindrical hub portion of the second rotatable member and the first rotatable member.
Figure 19:
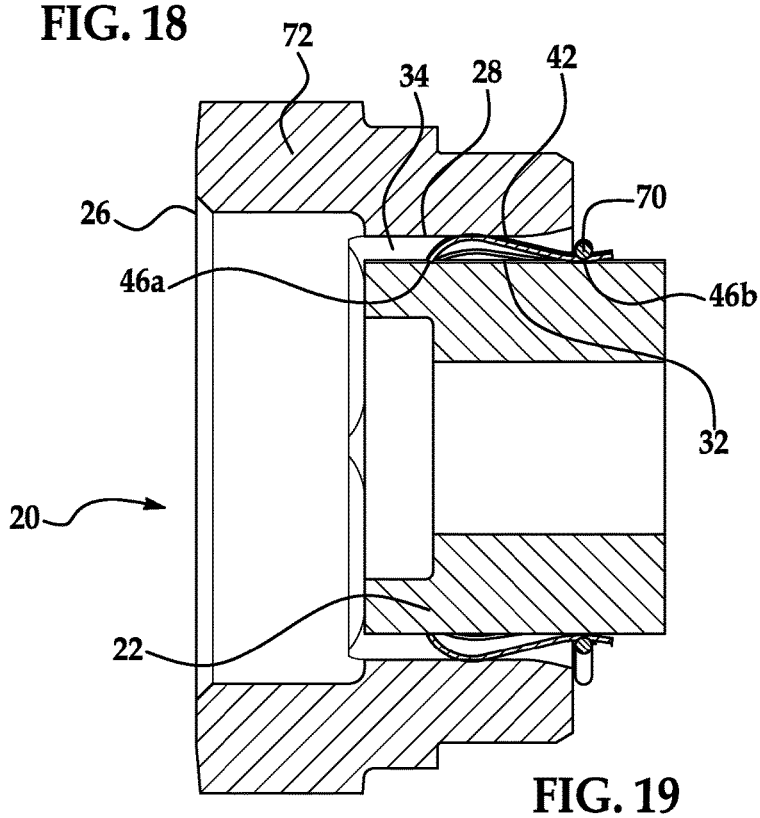
FIG. 19 is a detailed cross sectional view of the coupling assembly illustrated in FIG. 18.

Referring now to FIGS. 18-19, a coupling assembly 20 can include a first rotatable member 22 engageable with a cylindrical hub portion of a second rotatable member 26. By way of example and not limitation, the first rotatable member 22 can be associated with an electric motor, or actuator for actuation of a rotatable phasing member operable for varying a phase relationship between a crankshaft and camshaft located in an internal combustion engine. The cylindrical hub portion of the second rotatable member 26 can include an interior surface 28 for receiving the first rotatable member 22. The coupling assembly 20 can include a plurality of springs 42 interposed between the interior surface 28 of the cylindrical hub portion of the second rotatable member 26 and the first rotatable member 22. As best illustrated in FIG. 18, the first rotatable member 22 can include at least one inner surface 52 for receiving a third rotatable shaft 54 and a plurality of load-bearing surfaces 32 extending axially. The first rotatable member 22 can be rotatable about a longitudinal primary axis and the second rotatable member 26 can be rotatable about a longitudinal secondary axis. The first rotatable member 22 can include six load-bearing surfaces 32 such that the first rotatable member 22 has a generally hexagonal exterior shape. The plurality of load-bearing surfaces 32 can accommodate a first radial clearance 34 between the cylindrical hub portion of the second rotatable member 26 and the first rotatable member 22. The hexagonal shape of the first rotatable member 22 can be sheathed within a corresponding complementary generally hexagonal shape recess formed by interior surface 28 of the second rotatable member 26 to limit the degree of relative rotation between the first and second rotatable members 22, 26 providing a relative degree of rotational lock between the first and second rotatable members 22, 26 with respect to one another while permitting relative movement through the spring occupied clearance 34 between the first and second rotatable members 22, 26 to accommodate axial misalignment and build up of manufacturing and assembly tolerances.

Each of the plurality of springs 42 can correspond to and engage one of the plurality of load-bearing surfaces 32. By way of example and not limitation, each of the plurality of springs 42 can include a leaf spring having a flexible rectangular portion for transferring rotational torque from the first rotatable member 22 to a generally hexagonal interior surface 28 of the cylindrical hub portion of the second rotatable member 26. Each of the plurality of springs 42 can include a first contact point 46a and second contact point 46b. The flexible rectangular portion of each of the plurality of springs 42 can extend between the first and second contact point 46a, 46b. The first rotatable member 22 can include a retainer clip 70 with a unitary body anchoring each of the plurality of springs 42 to one of the plurality of load-bearing surfaces 32 at the second contact point 46b. The retainer clip 70 and the plurality of springs 42 can be preassembled and formed of a stamped material for placement on the plurality of load-bearing surfaces 32. The flexible rectangular portion of each of the plurality of springs 42 can engage the generally hexagonal shape interior surface 28 of the cylindrical hub portion of the second rotatable member 26 for transferring torque from the first rotatable member 22 to the cylindrical hub portion of the second rotatable member 26.

Referring now to FIG. 18, a cylindrical hub portion of the second rotatable member 26 can include a first generally hexagonal shape interior surface portion 28. It should be recognized that any suitable configuration of load bearing interior surface 28 can be provided, such as by way of example and not limitation, triangular, rectangular, square, pentagonal, hexagonal, octagonal, or other multi-sided geometric shape. By way of example and not limitation, an external sun gear 72 can be formed on the cylindrical hub portion of the second rotatable member 26. When the first rotatable member 22 is assembled in the cylindrical hub portion of the second rotatable member 26, the plurality of load-bearing surfaces 32 can accommodate a radial clearance 34 located between the load-bearing surfaces 32 of the first rotatable member 22 and the interior surface 28 of the cylindrical hub portion of the second rotatable member 26. The radial clearance 34 operably provides space where leaf springs 42 are located to assist in torque and load transfer between the first and second rotatable members 22, 26, while accommodating misalignment and build up of manufacturing and assembly tolerances. In operation, the first rotatable member 22 can be rotatable by an electric motor, such that the plurality of load-bearing surfaces 32 and the plurality of springs 42 engage with the interior surface 28 of the cylindrical hub portion of the second rotatable member 26 and rotationally lock the cylindrical hub portion of the second rotatable member 26 for a direct drive relationship with the first rotatable member 22. When the first rotatable member 22 and the cylindrical hub portion of the second rotatable member 26 are locked for rotation, the plurality of load-bearing surfaces 32 can transfer rotational driving torque from the first rotatable member 22 to drive the second rotatable member 24 through the load-bearing surfaces 32 contacting the leaf springs 42.

By way of example and not limitation, in an internal combustion engine, the sun gear 72 can be coupled for rotation with a phaser including a planetary gear transmission system. The sun gear 72 can have teeth 74 formed on an exterior surface engageable with a plurality of planetary gears driven by a ring gear having a sprocket connected thereto to be driven by connection to a crankshaft of an internal combustion engine. The phaser can be driven in rotation by the crankshaft, while phase change rotation, either advancing or retarding motion, can be driven by the sun gear for varying a phase angle relationship between the camshaft driven by the crankshaft.

It is also contemplated, by way of example and not limitation, that the first rotatable member 22, 122, 222 and second rotatable member 26, 126, 226 can be coupled with a single axial motion during assembly of the coupling 20, 120, 220. It is considered to be within the scope of this disclosure that one of the first and second rotatable member 22, 122, 222; 26, 126, 226 can be inaccessible for alignment purposes, such as located within a cover in an automotive application. By way of example and not limitation, the coupling can be attached to a motor or alternative power source with a cover or frame having an aperture allowing assembly of the first and second rotatable members 22, 122, 222; 26, 126, 226 with a simple axial insertion movement during assembly of the motor or power source to the device to be driven.

A method of compensating for mechanical tolerances in a coupling engageable between a first rotatable member 22, 122, 222 and a second rotatable member 26, 126, 226 can include connecting a cylindrical hub portion of the second rotatable member portion to one of the first and second rotatable members 22, 26; 122, 126; 222, 226, connecting a plurality of load-bearing surfaces 32, 132, 232 to an other of the first and second rotatable members 22, 26; 122, 126; 222, 226, and inserting a plurality of leaf springs 42, 142, 242 between the cylindrical hub portion of the second rotatable member and the plurality of load-bearing surfaces to transfer torque and rotation between the first and second rotatable members 22, 26; 122, 126; 222, 226 while accommodating axial misalignment and build up of manufacturing and assembly tolerances. The first rotatable member 22, 122, 222 can be rotatable about a longitudinal primary axis and the second rotatable member 24 can be rotatable about a longitudinal secondary axis. The cylindrical hub portion of the second rotatable member 26, 126, 226 can be positioned for operably driving the second rotatable shaft 24 through a planetary gear drive system associated with the sun gear 72, 172, 272, and can include an interior surface 28, 128, 228 for receiving the first rotatable member 22, 122, 222. The cylindrical hub portion of the second rotatable member 26, 126, 226 can be operable for accommodating axial misalignment between the first and second rotatable member 22, 24, 122, 222. The plurality of load-bearing surfaces 32, 132, 232 can be associated with the first rotatable member 22, 122, 222 and engageable by the plurality of springs 42, 142, 242. The plurality of load-bearing surfaces 32, 132, 232 can accommodate radial clearances 34, 36; 134, 136; 234 between the first rotatable member 22, 122, 222 and the cylindrical hub portion of the second rotatable member 26, 126, 226. The plurality of load-bearing surfaces 32, 132, 232 can provide rotational driving torque from the first rotatable member 22, 122, 222 to the cylindrical hub portion of the second rotatable member 26, 126, 226 through the plurality of springs 42, 142, 242. Each of the plurality of springs 42, 142, 242 can have a first contact point 46a, 146a, 246a, and a second contact point 46b, 146b, 246b and be operable for transferring torque from the first rotatable member 22, 122, 222 to the cylindrical hub portion of the second rotatable member 26, 126, 226. It should be recognized by those skilled in the art that the plurality of springs 42, 142, 242 can be formed as a single unitary monolithic part, such that a connecting ring member attaches the individual leaf spring tabs to one another. A retaining clip and retaining ring can also be formed integrally with the single unitary monolithic part. The plurality of springs 42, 142, 242, or single unitary monolithic spring configuration, can be formed of a stamped material.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A coupling assembly (20, 120, 220) for transmitting torque between a first rotatable shaft (54) having a longitudinal primary axis to a second rotatable shaft (24) having a longitudinal secondary axis comprising:
    a first rotatable member (22, 122, 222) having a plurality of external load-bearing surfaces (32, 132, 232);
    a second rotatable member (26, 126, 226) defining a cylindrical hub encircling the first rotatable member (22, 122, 222), the second rotatable member (26, 126, 226) having an interior surface (28) radially spaced outwardly from the load-bearing surfaces (32, 132, 232) of the first rotatable member (22, 122, 222), an interstitial space defined between the plurality of load-bearing surfaces (32, 132, 232) and the interior surface (28, 30) providing radial clearances (34, 36, 134, 136, 234) between the first rotatable member (22, 122, 222) and the second rotatable member (26, 126, 226) to accommodate axial misalignment and build up of manufacturing and assembly tolerances; and
    a plurality of springs (42, 142, 242) extending within the interstitial space defined between the first rotatable member (22, 122, 222) and the second rotatable member (26, 126, 226), each of the plurality of springs (42, 142, 242) directly contacting the plurality of external load-bearing surfaces (32, 132, 232) and the interior surface (28) for transferring rotational torque between the first rotatable member (22, 122, 222) and the second rotatable member (26, 126, 226).

2. The coupling assembly (20) of claim 1, wherein the first rotatable member (22) includes a first end (56) and a second end (58), the plurality of load-bearing surfaces (32) extending axially between the first end (56) and the second end (58), the first end (56) having an enlarged flange with a plurality of radially spaced peripheral surfaces (60) positioned radially outwardly with respect to the plurality of load-bearing surfaces (32), the plurality of load-bearing surfaces (32) defining a first radial clearance (34) between the interior surface (28) of the second rotatable member(26) and the first rotatable member (22), the plurality of radially spaced peripheral surfaces (60) defining a second radial clearance (36) smaller than the first radial clearance (34) between the surface (30) of the second rotatable member (26) and the first rotatable member (22).

3. The coupling assembly (20) of claim 2, wherein each of the plurality of springs (42) further comprises:
    a leaf spring having a flexible rectangular portion (48, 148, 248), a first contact point (46a) and a second contact point (46b), the first contact point (46a) located at the first end (56) of the first rotatable member (22) adjacent the enlarged flange having the plurality of radially spaced peripheral surfaces (60), the second contact point (46b) located adjacent the second end (58) of the first rotatable member (22), the flexible rectangular portion (48) of each of the plurality of springs (42) extending between the first and second contact point (46a, 46b).

4. The coupling assembly (20) of claim 2 further comprising:
    a retaining ring (66) secured adjacent the second end (58) of the first rotatable member (22) via a plurality of grooves (68) disposed about a periphery of the second end (58), the retaining ring (66) preventing axial movement of the plurality of springs (42); and a retainer clip (70) anchoring each of the plurality of springs (42) to one of the plurality of load-bearing surfaces (32).

5. The coupling assembly (20) of claim 1, wherein the second rotatable member (26) further comprises:
a first interior surface portion (28) and a second interior surface portion (30) longitudinally adjacent to one another, the first interior surface portion (28) complementarily in shape with respect to an enlarged flange portion of the first rotatable member (22), the second interior surface portion (30) sheathing an end portion of the second rotatable shaft (24).

6. The coupling assembly (120) of claim 1 further comprising:
the first rotatable member (122) having a first inner surface (152a), a second inner surface (152b) for receiving the first rotatable shaft (54); and
a plurality of locking members (82) interposed between the second rotatable member (126) and the first rotatable member (122), each of the plurality of locking members (82) engageable with one of the plurality of load-bearing surfaces (132).

7. The coupling assembly (120) of claim 6 further comprising:
a central hub (84) operably associated with the plurality of locking members (82) and received within the first inner surface (152a) of the first rotatable member (122).

8. The coupling assembly (120) of claim 6 further comprising:
a retaining ring (66) securing each of the plurality of springs (142) to the corresponding one of the plurality of load-bearing surfaces (132) at a second contact point (146b), each of the plurality of springs (142) cantilevered radially outwardly to support one of the plurality of locking members (82) with respect to the first rotatable member (122).

9. In an electrically driven phaser (92) for varying a phase relationship between a camshaft (24) driven by a crankshaft of an internal combustion engine, the electrically driven phaser including a gear assembly located between an electric motor and the camshaft (24) for transferring rotational torque from the electric motor to the camshaft (24), and a coupling assembly (20, 120, 220) located between the electric motor and the camshaft (24), the improvement of the coupling assembly (20, 120, 220) comprising:
a first rotatable member (22, 122, 222) having a plurality of external load-bearing surfaces (32, 132, 232);
a second rotatable member (26, 126, 226) defining a cylindrical hub encircling the first rotatable member (22, 122, 222), the second rotatable member (26, 126, 226) having an interior surface (28, 30) radially spaced outwardly from the load-bearing surfaces (32, 132, 232) of the first rotatable member (22, 122, 222), an interstitial space defined between the plurality of load-bearing surfaces (32, 132, 232) and the interior surface (28, 30) providing radial clearances (34, 36, 134, 136, 234) between the first rotatable member (22, 122, 222) and the second rotatable member (26, 126, 226) to accommodate axial misalignment and build up of manufacturing and assembly tolerances; and
a plurality of springs (42, 142, 242) extending within the interstitial space defined between the first rotatable member (22, 122, 222) and the second rotatable member (26, 126, 226), each of the plurality of springs (42, 142, 242) for transferring rotational torque between the first rotatable member (22, 122, 222) and the second rotatable member (26, 126, 226).

10. The improvement of claim 9, wherein the plurality of springs further comprises:
the plurality of springs (42, 142, 242) interposed between the second rotatable member (26, 126, 226) and the first rotatable member (22, 122, 222), each of the plurality of springs (42, 142, 242) having a first contact point (46a, 146a, 246a) and a second contact point (46b, 146b, 246b) and a flexible rectangular portion (48, 148,248)extending between the first and second contact points (46a, 46b; 146a, 146b; 246a, 246b),the plurality of springs (42, 142, 242) for transferring torque between the first rotatable member (22, 122, 222) to the second rotatable member (26, 126, 226).

11. The improvement of claim 9, wherein the plurality of springs further comprises:
the plurality of springs (42, 142, 242) interposed between and connected to the second rotatable member (26, 126, 226) or the first rotatable member (22, 122, 222).

12. The improvement of claim 8 further comprising:
the first rotatable member (122) having a first inner surface (152a), a second inner surface (152b) for receiving a first rotatable shaft (54), and a plurality of recesses (80) defined through the plurality of load-bearing surfaces (132); and
a plurality of locking members (82) interposed between the second rotatable member (126) and the first rotatable member (122), each of the plurality of locking members (82) biased radially outwardly by a corresponding one of the plurality of springs (142) and engageable through a corresponding one of the plurality of recesses (80) and including a seating surface (88) engageable with one of the plurality of load-bearing surfaces (132).

13. A method of compensating for mechanical tolerances within a coupling for joining a first rotatable shaft (54) having a longitudinal primary axis and a second rotatable shaft (24) having a longitudinal secondary axis comprising:
forming a first rotatable member (22, 122, 222) having a plurality of external load-bearing surfaces (32, 132, 232) extending between a first end (56) and a second end (58);
positioning a second rotatable member (26, 126, 226) defining a cylindrical hub sheathing the first rotatable member (22, 122, 222), the second rotatable member (26, 126, 226) having an interior surface (28) radially spaced outwardly from the load-bearing surfaces (32, 132, 232) of the first rotatable member (22, 122, 222), an interstitial space defined between the plurality of load-bearing surfaces (32, 132, 232) and the interior surface (28) providing radial clearances (34, 36, 134, 136, 234) between the first rotatable member (22, 122, 222) and the second rotatable member (26, 126, 226) to accommodate axial misalignment and build up of manufacturing and assembly tolerances; and
assembling a plurality of springs (42, 142, 242) extending within the interstitial space defined between the first rotatable member (22, 122, 222) and the second rotatable member (26, 126, 226), each of the plurality of springs (42, 142, 242) directly contacting the plurality of external load-bearing surfaces (32, 132, 232) and the interior surface (28) for transferring rotational torque between the first rotatable member (22, 122, 222) and the second rotatable member (26, 126, 226).

14. The method of claim 13 further comprising:
forming a plurality of recesses (80) through the plurality of load-bearing surfaces (132) of the first rotatable member (122), the first rotatable member (122) having a first inner surface (152*a*), a second inner surface (152*b*) for receiving the first rotatable shaft (54); and interposing a plurality of locking members (82) between the second rotatable member (126) and the first rotatable member (122), each of the plurality of locking members (82) biased radially outwardly by a corresponding one of the plurality of springs (142) and engageable through a corresponding one of the plurality of recesses (80) and including a seating surface (88) engageable with one of the plurality of load-bearing surfaces (132).

15. The method of claim 13 further comprising:

forming a plurality of radially spaced peripheral surfaces (60) positioned radially outwardly with respect to the plurality of load-bearing surfaces (32) at the first end (56) of the first rotatable member (22);

forming a plurality of toothed stops (62) on the first rotatable member (22), each of the plurality of toothed stops (62) centered on each one of the plurality of radially spaced peripheral surfaces (60); and biasing the plurality of toothed stops (62) of the first rotatable member (22) against the cylindrical hub of the second rotatable member (26) through the plurality of springs (42).

* * * * *